US007260638B2

(12) United States Patent
Crosbie (10) Patent No.: US 7,260,638 B2
(45) Date of Patent: Aug. 21, 2007

(54) METHOD AND SYSTEM FOR ENABLING SEAMLESS ROAMING IN A WIRELESS NETWORK

(75) Inventor: David B. Crosbie, Somerville, MA (US)

(73) Assignee: Bluesocket, Inc., Burlington, MA (US)

( * ) Notice: Subject to any disclaimer, the term of this patent is extended or adjusted under 35 U.S.C. 154(b) by 737 days.

(21) Appl. No.: 09/911,092

(22) Filed: Jul. 23, 2001

(65) Prior Publication Data

US 2002/0035699 A1 Mar. 21, 2002

Related U.S. Application Data

(60) Provisional application No. 60/220,385, filed on Jul. 24, 2000.

(51) Int. Cl.
*G06F 15/16* (2006.01)

(52) U.S. Cl. ........................ 709/229; 709/223; 709/225; 709/226; 709/228; 707/9; 707/10

(58) Field of Classification Search ................ 709/223, 709/225, 226, 228, 229; 707/9, 10
See application file for complete search history.

(56) References Cited

U.S. PATENT DOCUMENTS

| 5,239,466 | A | 8/1993 | Morgan et al. |
| 5,301,356 | A | 4/1994 | Bodin et al. |
| 5,423,065 | A | 6/1995 | Pinard |
| 5,448,570 | A | 9/1995 | Toda et al. ................. 370/95.3 |
| 5,457,680 | A | 10/1995 | Kamm et al. |
| 5,629,981 | A | 5/1997 | Nerlikar |
| 5,657,317 | A | 8/1997 | Mahany et al. |
| 5,668,875 | A | 9/1997 | Brown et al. |

(Continued)

FOREIGN PATENT DOCUMENTS

EP        0 504 122 A2    9/1992

(Continued)

OTHER PUBLICATIONS

International Search Report for International Application No. PCT/US02/30558, dated Mar. 28, 2003.

(Continued)

*Primary Examiner*—Saleh Najjar
*Assistant Examiner*—Liang-che Wang
(74) *Attorney, Agent, or Firm*—Goodwin Procter LLP (57) ABSTRACT

A gateway server manages connections in a wireless local area network (WLAN). The gateway server provides context information, such as an IP address, that is stored after being previously allocated to a mobile device in a previous connection to the WLAN. The gateway server reassigns the IP address to the mobile device after it reconnects to the WLAN after a disconnection, thus providing seamless roaming for the mobile device from WLAN to WLAN (or subnets within one WLAN) without requiring the user of the device to re-register. The gateway server also provides cluster information (e.g., as part of the context information) for a mobile device making a new connection to the WLAN, such as access privileges associated with the cluster of users of the mobile devices. The gateway server also provides load balancing among two or more WLAN's by directing a newly connection mobile device to another WLAN (or subnet), if less congestion results.

18 Claims, 9 Drawing Sheets

U.S. PATENT DOCUMENTS

| | | | |
|---|---|---|---|
| 5,673,031 A | 9/1997 | Meier | |
| 5,809,415 A | 9/1998 | Rossmann | 455/422 |
| 5,889,942 A | 3/1999 | Orenshteyn | |
| 5,901,144 A | 5/1999 | Maki et al. | |
| 5,915,008 A | 6/1999 | Dulman | |
| 5,940,591 A | 8/1999 | Boyle et al. | 395/187.01 |
| 5,949,776 A | 9/1999 | Mahany et al. | |
| 5,953,507 A | 9/1999 | Cheung et al. | |
| 5,987,062 A | 11/1999 | Engwer et al. | |
| 6,014,558 A | 1/2000 | Thomas | 455/410 |
| 6,018,657 A | 1/2000 | Kennedy, III et al. | 455/426 |
| 6,026,297 A | 2/2000 | Haartsen | |
| 6,038,458 A | 3/2000 | Siira | |
| 6,044,401 A | 3/2000 | Harvey | |
| 6,044,465 A | 3/2000 | Dutcher et al. | |
| 6,055,236 A | 4/2000 | Nessett et al. | |
| 6,073,234 A | 6/2000 | Kigo et al. | |
| 6,081,900 A | 6/2000 | Subramaniam et al. | 713/201 |
| 6,115,390 A | 9/2000 | Chuah | |
| 6,115,615 A | 9/2000 | Ota et al. | |
| 6,134,591 A | 10/2000 | Nickles | 709/229 |
| 6,137,791 A | 10/2000 | Frid et al. | 370/352 |
| 6,141,690 A | 10/2000 | Weiman | |
| 6,151,628 A | 11/2000 | Xu et al. | |
| 6,161,139 A * | 12/2000 | Win et al. | 709/225 |
| 6,172,986 B1 | 1/2001 | Watanuki et al. | |
| 6,182,076 B1 | 1/2001 | Yu et al. | |
| 6,192,130 B1 | 2/2001 | Otway | |
| 6,195,705 B1 | 2/2001 | Leung | |
| 6,205,480 B1 | 3/2001 | Broadhurst et al. | |
| 6,223,291 B1 | 4/2001 | Puhl et al. | |
| 6,233,577 B1 * | 5/2001 | Ramasubramani et al. | 707/9 |
| 6,243,581 B1 | 6/2001 | Jawanda | |
| 6,256,300 B1 | 7/2001 | Ahmed et al. | |
| 6,256,737 B1 | 7/2001 | Bianco et al. | |
| 6,292,657 B1 * | 9/2001 | Laursen et al. | 455/411 |
| 6,301,471 B1 * | 10/2001 | Dahm et al. | 455/405 |
| 6,377,548 B1 | 4/2002 | Chuah | |
| 6,427,174 B1 | 7/2002 | Sitaraman et al. | 709/245 |
| 6,493,749 B2 | 12/2002 | Paxhia et al. | 709/220 |
| 6,577,733 B1 * | 6/2003 | Charrin | 380/251 |
| 6,594,484 B1 * | 7/2003 | Hitchings, Jr. | 455/414.1 |
| 6,600,734 B1 | 7/2003 | Gernert et al. | |
| 6,633,761 B1 | 10/2003 | Singhal et al. | 455/436 |
| 6,769,009 B1 | 7/2004 | Reisman et al. | |
| 6,772,331 B1 * | 8/2004 | Hind et al. | 713/151 |
| 2001/0001268 A1 | 5/2001 | Menon et al. | 370/329 |
| 2001/0012777 A1 | 8/2001 | Igarashi et al. | |
| 2001/0014917 A1 | 8/2001 | Ishiyama et al. | |
| 2001/0016492 A1 | 8/2001 | Igarashi et al. | |
| 2001/0017856 A1 | 8/2001 | Asokan et al. | |
| 2001/0020241 A1 | 9/2001 | Kawamoto et al. | |
| 2001/0023446 A1 | 9/2001 | Balogh | |
| 2001/0024443 A1 | 9/2001 | Alriksson et al. | |
| 2001/0031634 A1 | 10/2001 | Mizutani et al. | |
| 2001/0036224 A1 | 11/2001 | Demello et al. | |
| 2001/0043571 A1 | 11/2001 | Jang et al. | |
| 2001/0044305 A1 | 11/2001 | Reddy et al. | |
| 2001/0048686 A1 | 12/2001 | Takeda et al. | |
| 2002/0010758 A1 | 1/2002 | Chan | |
| 2002/0013831 A1 | 1/2002 | Astala et al. | |
| 2002/0032855 A1 | 3/2002 | Neves et al. | |
| 2002/0032858 A1 | 3/2002 | Nakkano et al. | |
| 2002/0034298 A1 | 3/2002 | Gallagher et al. | |
| 2002/0034301 A1 | 3/2002 | Andersson | |
| 2002/0035699 A1 | 3/2002 | Crosbie | |
| 2002/0037708 A1 | 3/2002 | McCann et al. | |
| 2002/0046179 A1 | 4/2002 | Kokudo | |
| 2002/0046285 A1 | 4/2002 | Yasushi et al. | |
| 2002/0052965 A1 | 5/2002 | Dowling | |
| 2002/0066029 A1 | 5/2002 | Yi | |
| 2002/0066032 A1 | 5/2002 | Kurumida | |
| 2002/0066036 A1 | 5/2002 | Makineni et al. | |
| 2002/0069278 A1 | 6/2002 | Forslow | |
| 2002/0069282 A1 | 6/2002 | Reisman | |
| 2002/0073240 A1 | 6/2002 | Kokkinen et al. | |
| 2002/0075844 A1 | 6/2002 | Hagen | |
| 2002/0085719 A1 | 7/2002 | Crosbie | |
| 2002/0087335 A1 | 7/2002 | Meyers et al. | |
| 2002/0098840 A1 | 7/2002 | Hanson et al. | |
| 2002/0101848 A1 | 8/2002 | Lee et al. | |
| 2002/0114303 A1 | 8/2002 | Crosbie et al. | |
| 2002/0124109 A1 | 9/2002 | Brown | |
| 2002/0129094 A1 | 9/2002 | Reisman | |
| 2002/0136226 A1 | 9/2002 | Christoffel et al. | |
| 2002/0138620 A1 | 9/2002 | Brown | |
| 2002/0144144 A1 | 10/2002 | Weiss | |
| 2003/0035388 A1 | 2/2003 | Schmidt | |
| 2003/0087629 A1 | 5/2003 | Juitt et al. | |
| 2003/0154110 A1 | 8/2003 | Walter et al. | |
| 2004/0167984 A1 | 8/2004 | Herrmann | |
| 2004/0193921 A1 | 9/2004 | Byrne | |

FOREIGN PATENT DOCUMENTS

| | | | |
|---|---|---|---|
| EP | 0 883 266 A2 | 12/1998 | |
| EP | 0 903 873 A1 | 3/1999 | |
| EP | 0 964 599 A | 12/1999 | |
| EP | 0 982 662 A | 3/2000 | |
| EP | 0 984 639 A | 3/2000 | |
| EP | 1 009 176 A2 | 6/2000 | |
| EP | 1 011 243 A1 | 6/2000 | 29/12 |
| EP | 1 011 278 A2 | 6/2000 | |
| JP | 1 131 7744 | 11/1999 | |
| WO | WO 00/36522 | 6/2000 | 15/15 |
| WO | WO 00/79727 | 12/2000 | |
| WO | WO 01/19097 | 3/2001 | |
| WO | WO 01/50781 A2 | 7/2001 | |
| WO | WO 02/09458 A2 | 1/2002 | |
| WO | PCT/US02/08986 | 3/2002 | |
| WO | WO 02/41587 A2 | 5/2002 | 12/12 |
| WO | WO 02/065707 A2 | 8/2002 | 12/28 |

OTHER PUBLICATIONS

Bluetooth Specification Version 1.0 B, *10 Channel Control* (Nov. 29, 1999), pp. 95-126.

International Search Report for International Application No. PCT/US01/49547, dated Feb. 28, 2003.

Bluesocket Press Release "Bluesocket Secures 5M in First-Round Funding from St. Paul Venture Capital and Osborn Capital LLC", (2 pages) [online], [Retrieved on Nov. 19, 2002]. *Retrieved from the Internet*: <URL:http://www.bluesocket.com/news/funding.html>.

Bray et al., "Bluetooth—Connect Without Cables", (New Jersey, Prentice Hall, Mar. 20, 2001), XP002221666, p. 84, ¶5.7—p. 86, ¶5.8.

Bray et al., "Bluetooth—Connect Without Cables", (New Jersey, Prentice Hall, Mar. 30, 2001), XP002221667, p. 115-118.

Mouly et al., "GSM—The System for Mobile Communications" (Palaiseau, France, Sep. 2, 1993), XP002221665, p. 327-330.

International Search Report for International Application No. PCT/US01/51306, dated Dec. 3, 2002.

Bluetooth Specification Version 1.1, *Section 10.9 Scatternet*: 120-123 (2001).

Bluetooth Specification Version 1.1, *Part C: Link Manager Protocol*: 184-252 (2001).

Bluetooth Specification Version 1.1, *Part H:1: Host Controller Interface Functional Specification*: 536-780 (2001).

Bluetooth Specification Version 1.1, *Part H:2: HCI USB Transport Layer*: 782-796 (2001).

Bluetooth Specification Version 1.1, *Part H:3: HCI RS232 Transport Layer*: 798-818 (2001).

Bluetooth Specification Version 1.1, *Part H:4: HCI UART Transport Layer*: 820-826 (2001).

"PSDN Solution for CDMA2000 Networks," (2 pgs.) [online], [Retrieved on Jan. 25, 2002]. *Retrieved from the Internet*: <URL:http://www.cisco.com/warp/public/779/servpro/solutions/wireless_mobile/pdsn.html>.

Cisco White Paper, "Cisco Code-Division Multiple Access Performance Management", (15 pgs.) [online], [Retrieved on Jan. 25, 2002]. *Retrieved from the Internet*: <URL:http://www.cisco.com/warp/public/779/servpro/solutions/wireless_mobile/pdsn.html>.

Haartsen, J., "Bluetooth-The universal radio interface for *ad hoc*, wireless connectivity", *Ericsson Review No. 3*, pp. 110-117, 1998, XP000783249 ISSN: 0014-0171.

Lough et al., "A Short Tutorial on Wireless LANs and IEEE 802.11", (5 pgs.) [online], [Retrieved on Oct. 16, 2001]. *Retrieved from the Internet*: <URL:http://www.computer.org/students/looking/summer97/ieee802.htm>.

"Medium Access Control (MAC) and Physical (PHY) Specifications," *MAC Sublayer Management Entity*: 123-128, ANSI/IEEE Std 802.11 (1999).

Mitzel, D., "Overview of 2000 IAB Wireless Internetworking Workshop", (40 pgs.) [online], Dec. 2000 [Retrieved on Jan. 25, 2002]. *Retrieved from the Internet*: <URL:http://www.ietf.org/rfc/rfc3002.txt?number=3002>.

Perkins, C., "IP Mobility Support", (67 pgs.) [online], Oct. 1996 [Retrieved on Sep. 16, 2002]. *Retrieved from the Internet*: <URL:http://www.ietf.org/rfc/rfc2002.txt?number=2002>.

"A Practical Approach to Identifying and Tracking Unauthorized 802.11 Cards and Access Points", (26 pgs.) [online], [Retrieved on Sep. 10, 2001]. *Retrieved from the Internet*: <URL:http://www.interlinknetworks.com/graphics/news/wireless_detection_and_tracking.pdf>.

"RoamAD" (6 pgs.) [online], [Retrieved on Sep. 16, 2002]. *Retrieved from the Internet*: <URL:http://www.roamad.com/roam>.

Solomon, J., "Applicability Statement for IP Mobility Support", (5 pgs.) [online], Oct. 1996 [Retrieved on Jan. 25, 2002]. *Retrieved from the Internet*: <URLhttp://www.ietf.org/rfc/rfc2005.txt?number=2005>.

Townsley, W., et al., "Layer Two Tunneling Protocol 'L2TP'," [online], Aug. 1999 [Retrieved on Aug. 29, 2001]. *Retrieved from the Internet*: <URL:http://www.ietf.org/rfc/rfc2661.txt?number=2661>.

Vernier Networks Whitepaper, "Controlling the Network Edge: Vernier Networks and the Enterprise", (7 pgs.) [online], Jun. 2002 [Retrieve on Sep. 10, 2002]. *Retrieved from the Internet*: <URL:www.verniernetworks.com>.

Vernier Networks Whitepaper, "High Availability for Wireless Edge Connectivity", (6 pgs.) [online], Jun. 2002 [Retrieve on Sep. 10, 2002]. *Retrieved from the Internet*: <URL:www.verniernetworks.com>.

Vernier Networks Whitepaper, "The Vernier Networks System", (7 pgs.) [online], [Retrieve on Sep. 10, 2002]. *Retrieved from the Internet*: <URL:www.verniernetworks.com>.

Vernier Networks Whitepaper, "The Three Phases of WLAN Deployments", (2 pgs.) [online], Jun. 2002 [Retrieve on Sep. 10, 2002]. *Retrieved from the Internet*: <URL:www.verniernetworks.com>.

Vernier Networks Whitepaper, "Vernier Networks: Ensuring the Promise of 802.11b Networks", (5 pgs.) [online], Jun. 2002 [Retrieved on Sep. 10, 2002]. *Retrieved from the Internet*: <URL:www.verniernetworks.com>.

Vernier Networks Whitepaper, "Wireless Security: Protecting Your 802.11 Network", (3 pgs.) [online], Jun. 2002 [Retrieve on Sep. 10, 2002]. *Retrieve from the Internet*: <URL:www.verniernetworks.com>.

International Search Report for International Application No. PCT/US01/23145, dated Aug. 16, 2002.

International Search Report for International Application No. PCT/US02/08986, dated Aug. 19, 2002.

R. Schneiderman, "Bluetooth's slow dawn: Hype gives way to hard work as expectations for the mini radio network encounter nettlesome interoperability issues," *IEEE Spectrum*:61-65 (2000).

"Bluetooth Specification Version 1.1", *Lan Access Profile*: 275-308 (2001).

T. Muller, "Bluetooth White Paper", *Bluetooth Security Architecture Version 1.0:* 1-33 (1999).

ETSI HIPERLAN/2 standard [online], Sep. 2000 [retrieved on Jul. 16, 2001]. (3pgs.) Retrieved from the Internet <http://www.etsi.org/technicalactiv/hiperlan2.htm>.

Berger, S., et al., "Pervasive Networking Using Bluetooth: A Status Report and Future Plans," Presentation Slides and Paper (21 pgs.) *IBM Watson Research Center*: (1999).

European Search Report for Applciation No. 02725322.8 dated Aug. 26, 2005.

\* cited by examiner

METHOD AND SYSTEM FOR ENABLING SEAMLESS ROAMING IN A WIRELESS NETWORK

RELATED APPLICATION

This application claims the benefit of U.S. Provisional application Ser. No. 60/220,385 filed on Jul. 24, 2000, the entire teachings of which are incorporated herein by reference.

BACKGROUND OF THE INVENTION

Networked desktop computing is typical in both the office and home. Networking of mobile devices, such as mobile telephones, laptop computers, headsets, and PDA's (Personal Digital Assistants), is more difficult. One problem has been that there has not been a commonly accepted standard approach for attaching such devices, such as the mobile equivalent of a LAN (Local Area Network) card or a modem, to a WLAN (wireless LAN).

Bluetooth (BT) is a low cost wireless connection technology. The Bluetooth technology is described in the Bluetooth specification version 1.1, available from Bluetooth SIG, Inc. (see also the www.bluetooth.com web site.) This technology provides for a common attachment approach for different devices, and so enables mobile phones, laptops, headsets, and PDA's to be easily networked in the office and eventually in public locations. Other standards such as the IEEE 802.11 (Institute of Electrical & Electronics Engineers) and ETSI (European Telecommunications Standards Institute) HIPERLAN/2 provide a generally similar connection function as Bluetooth and may be used to support WLAN (see the IEEE 802.11 "Wireless LAN Medium Access Control (MAC) and Physical Layer Specifications" and ETSI specifications for HIPERLAN/2 such as ETSI document number TR 101 683, "Broadband Radio Access Networks (BRAN); HIPERLAN Type 2; System Overview").

Wireless LAN (WLAN) access points (LAP's) such as those used by 802.11 and Bluetooth are part of an IP subnet; that is, a range of IP addresses that are normally used by all the devices connected to a section of the network delineated by a router (which may also be known as a gateway), direct packets to and from devices that are outside the subnet.

In one conventional approach, devices (e.g., a router, gateway, or mobile devices) inside the subnet are primarily identified by their MAC address. This is a fixed address tied to the Ethernet card. IP addresses are associated with MAC addresses. There can be multiple IP addresses associated with a single MAC address. Each router or gateway device on the subnet maintains a cache which maps IP addresses within the sub-net to the associated MAC addresses. Data packets are sent to the MAC address associated with the IP address by the cache. (For destinations outside the sub-net the data is sent to the router which then forwards them.)

In order for a device (e.g., router or gateway) to find the MAC address associated with a particular IP address, an ARP (address resolution protocol) is used. The device (e.g., router or gateway) follows the ARP and sends out a broadcast message asking for the device associated with the included IP address to respond with its MAC address. Once received it is added to the cache.

For a situation where there are mobile devices attached to an access point then the mobiles MAC address is associated with an IP address from within the subnet IP address space. If the mobile device moves to another access point that is in the same subnet then all that is required is for the new access point to realize that it must respond to the MAC address of the mobile device that has just associated itself, and the previous access point to cease to response to that MAC address. The MAC to IP address cache does not need to be changed.

If, however, the mobile device moves to an access point connected to another subnet then the local MAC to IP cache does not apply. The mobile device would typically be required to obtain a new IP address and so break the previous connection. The user of the mobile device is typically re-required to re-establish a stateful end to end connection such as IPSec (IP Security Protocol, an encryption protocol from the Internet Engineering Task Force (IETF), an organized activity of the Internet Society), and so the user may be required to re-register with the WLAN. For example, the user may be required to re-enter a PIN (personal identification number) when connecting to a new subnet.

SUMMARY OF THE INVENTION

To be truly effective, mobile users must be able to move their mobile devices freely from location to location. For example, users must be able to move their mobile devices from the office to their own conference room to the airport lounge to their client's conference room, while maintaining access to the same set of resources without manually registering anew in each location. They should also be able to send and receive messages and voice calls, wherever they are located. Connection servers, such as routers, WLAN gateways, and security servers, should be able to handle a mobile device that moves its connection to the network from access point to access point, and from public to private networks.

Mobile devices also need to be allocated the appropriate amount of bandwidth to their class of service, and able to find and access the resources they need.

In the case of a BT based network or other wireless local area networks (WLAN), there are likely to be many small coverage areas and many network operators, and users are likely to roam much more frequently from one small coverage area to another. So there is a need for an automatic registration system that registers users as they move from one WLAN coverage area serviced by one wireless base station LAP (LAN access point) to another coverage area serviced by another wireless base station LAP, as well as between coverage areas supported by different security servers and network operators. The solution must be cost effective, but also scalable enough for it to be extendable to many thousands of service providers and millions of users. It is also important to implement the solution only in the network side, to avoid changes to the mobile device such as adding new software or hardware.

In general, the techniques of the invention manage WLAN connectors and maintain context information for connections to enable a user to move a mobile device so that its connection to the network moves from access point to access point, and from public to private networks without requiring re-registration by the user ("seamless roaming"). The solution provided by the invention described herein is an approach that is used by the network operator to enable roaming from subnet to subnet inside that WLAN supported by the network operator. This approach of the invention provided herein describes how to integrate separate WLAN coverage areas so that users of mobile wireless devices may seamlessly roam from location to location. In particular, it describes how to enable users with Bluetooth devices (or other wireless technologies) to move from wireless access node to another coverage area without requiring the user to re-register. It goes on to describe how independent networks can be linked so as to enable users to move easily between coverage areas managed by different servers and different operators.

With an existing conventional WLAN installation where there are multiple overlapping WLAN's, it is up to the mobile device to decide which WLAN to join, and the mobile device makes this decision irrespective of the loading level of the WLAN or its service level. This conventional approach can lead to a problem of having all the mobiles connected to the nearest access point and none attached to an access point that is farther away. The approach of the invention allows directing mobile devices away from busy or highly loaded WLAN's to a WLAN connection that provides better service for the mobile device and less overall congestion.

Thus, the present invention provides a method and system for managing access by a user to a resource over a WLAN by a gateway server. In particular, the method of the system (e.g., gateway server) includes setting access privileges to the resource for a cluster of users of the WLAN and receiving a request from a device controlled by the user to access the resource over the WLAN. The user has a membership in the cluster, and the request includes a user identifier for the user and a device identifier for the device making the request. The membership in a cluster typically reflects the user's role in an organization, such as a student who takes history classes at a university and is thus a member of the history cluster and is allowed access to a database of historical information. In another example, an accountant in a company is a member of a financial cluster and is allowed access to financial records. The method further includes locating access privileges based on the device identifier, the user identifier, and the cluster and authorizing a current session between the device and the resource based on the access privileges. Thus a gateway server can determine the access privileges for a mobile device seeking access to a WLAN based on the cluster the user belongs to.

In another aspect, the present invention provides a method and system (e.g., gateway server) for managing context information for a wireless local area network. The method includes receiving a request to access the resource over the WLAN, in which the request includes a device identifier for a device making the request and locates context information associated with the device identifier. The context information is associated with a previous session between the device and the resource. The method further includes providing the context information for use in a current session between the device and the resource. Thus the gateway server can reassign context information (e.g., IP address) from a previous session or connection to the mobile device, based on the device identifier without requiring re-registration by the user of the mobile device.

In a further aspect, the present invention provides a method and system (e.g., gateway server) for balancing the load among wireless local area networks. The method includes receiving an indication that a device has established a first connection with a first wireless local area network, the device having a device identifier and determining a user service level associated with the device based on the device identifier and based on a load level for the first wireless local area network in comparison to the load levels associated with each of the other wireless local area networks available for connection by the device. The method further includes directing the device to establish a second connection with a second wireless local area network based on the user service level and the load level of the first wireless local area network, if the second connection provides a preferable balancing of loads among the wireless local area networks. Thus, if the first WLAN that the mobile device connects to is congested, the gateway server can direct the mobile device to another WLAN that should provide a better level of service for the mobile device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
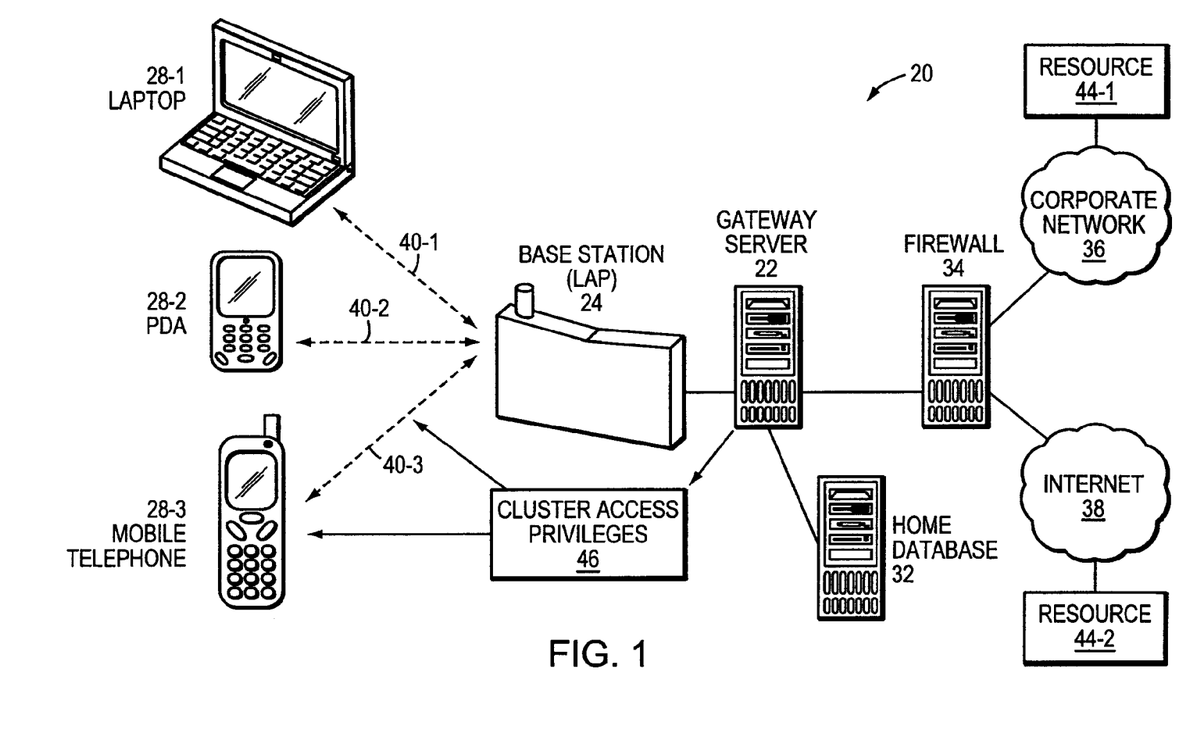
FIG. 1 illustrates a networked system that enables sharing of cluster access privileges in a WLAN provided by a gateway server configured according to the invention.

FIG. 1 illustrates a networked system 20 that enables sharing of cluster access privileges 46 in a WLAN provided by a gateway server 22 configured according to the invention. The networked system 20 includes one or more base stations or LAP's (LAN access points) 24 that provide access to a WLAN, mobile devices 28 (e.g., 28-1, 28-2, and 28-3), home database 32, firewall 34, corporate network 36, Internet 38, and various resources 44. In general, the invention may be used with any suitable wireless LAN, such as a WLAN based on Bluetooth, IEEE 802.11, ETSI HIPERLAN/2 or similar protocols. The mobile devices 28 are any suitable portable communications device that supports the Bluetooth (or other suitable WLAN protocol such as IEEE 802.11 or ETSI HIPERLAN/2) communications protocol. In a preferred embodiment, the mobile device 28 uses a radio communication frequency greater than 2000 megahertz (e.g., frequencies suitable for Bluetooth, IEEE 802.11, or ETSI HIPERLAN/2). The mobile devices 28 include, for example, a laptop computer 28-1, a PDA (personal digital assistant) 28-2, and a mobile telephone 28-3. The connections 40 (e.g., 40-1, 40-2, and 40-3) are Bluetooth wireless connections established between each mobile device 28-1, 28-2, and 28-3 and the LAP base station 24. The cluster access privileges 46 are access privileges providing access to a resource 44 (e.g., 44-1 or 44-2) from a mobile device 28 over a connection 40 and through the networked system 20. The resource 44-1 may be a server computer, database, or other electronic or computing resource available through the corporate network 36. The resource 44-2 may be a server computer, database, or other electronic or computing resource available through a global network, such as the Internet 38. A resource 44 is not required to be a computer system, but may be a component of a computer system, such as a database or application available on a server computer. The cluster access privileges 46 provide access to a resource 44 or specify the nature of the access, that is, the amount of bandwidth made available to a device 28 by the base station LAP 24 for a user that is a member of the respective cluster, as will be discussed in more detail later. The firewall 34 is a server or other computing device that controls access to the corporate network 36. The home database 32 is a centralized or home database (or computer server with database) that stores security certificates, such as those used to authenticate a user of a mobile device 28.

In a general summary of the operation of the networked system 20, the Bluetooth base station 24 uses a Bluetooth inquiry mode to discover devices 28 within radio communication range (based on frequencies supported by the Bluetooth protocol) of the base station 24, and/or a device 28 uses the inquiry mode to discover if the device 28 is within radio communication range of one or more base station LAN access points 24 (LAP's) that have advertised their presence within range of the device 28. The mobile device 28 then requests the establishment of a connection 40 to an appropriate LAP 24. A link is established using point to point connections (PPP) 40 over RFCOMM (a serial emulation protocol based on ETSI TS 07.10) and L2CAP (logical link controller adaptation protocol) according to techniques typical for Bluetooth WLAN. For other WLAN protocols such as 802.11b the link is made at protocol level 2 as opposed to protocol level 3 (PPP), so the link establishment is made using the TCP/IP protocol.

For devices 28 requesting Internet only access, then Bluetooth PIN (personal identification number) authentication can be used. The gateway server 22 allocates to the device 28 an IP address that the corporate firewall 34 blocks so as to deny access to the corporate network 36 by the device 28. In one embodiment, the gateway server 22 is a RADIUS (remote authentication dial-in service) server that is typically used to authenticate dial-in access to corporate networks 36 and Internet Service Provides (ISP's) and also provide Bluetooth gateway functionality and SDP (service discovery protocol) functionality.

For devices 28 requiring corporate LAN access, then strong authentication is used based on EAP (Extensible Authentication Protocol) based on a strong system based on SPEKE (Simple Password Authenticated Exponential Key Exchange), Smartcards, or Security Dynamics (e.g., Secure ID token card).

In a preferred embodiment, the gateway server 22 database is extended to map Bluetooth device numbers to "personal clusters" and hence to a person. Logging on one device 28 in a personal cluster can automatically enable all other devices 28 on the same LAP 24 to log on (that are in the same personal cluster) as determined by the users of the devices 28, as will be described in more detail later.

Figure 2:
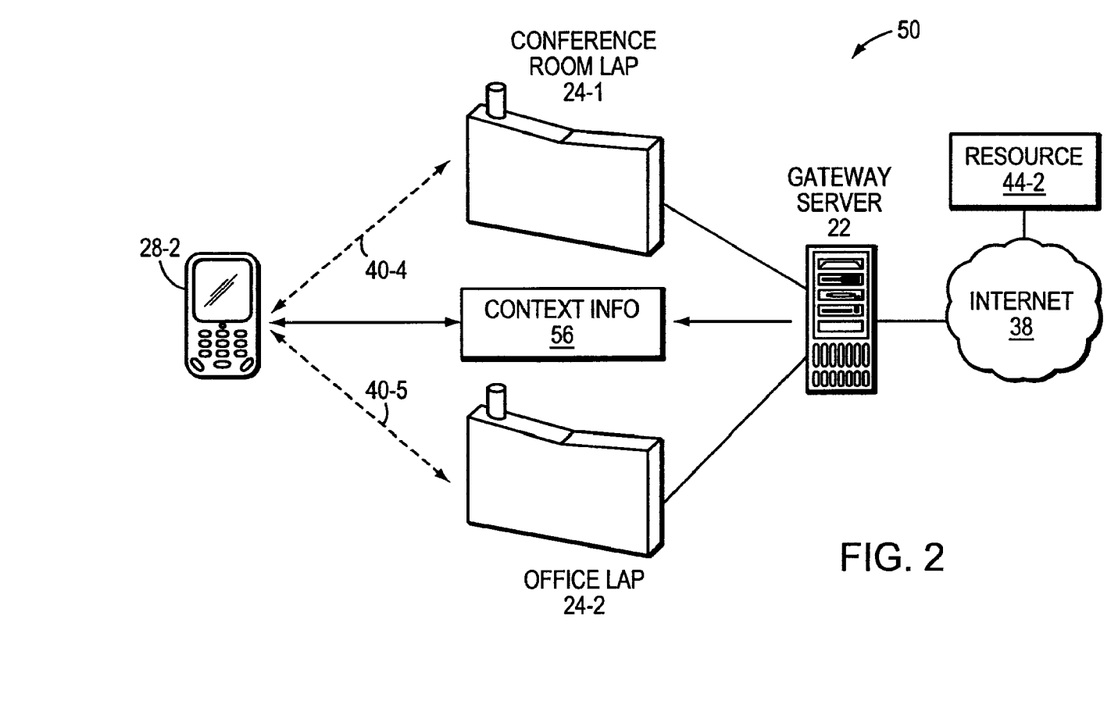
FIG. 2 illustrates a networked system that enables roaming of a wireless device between locations supported by a gateway server configured according to the invention.
Figure 3:
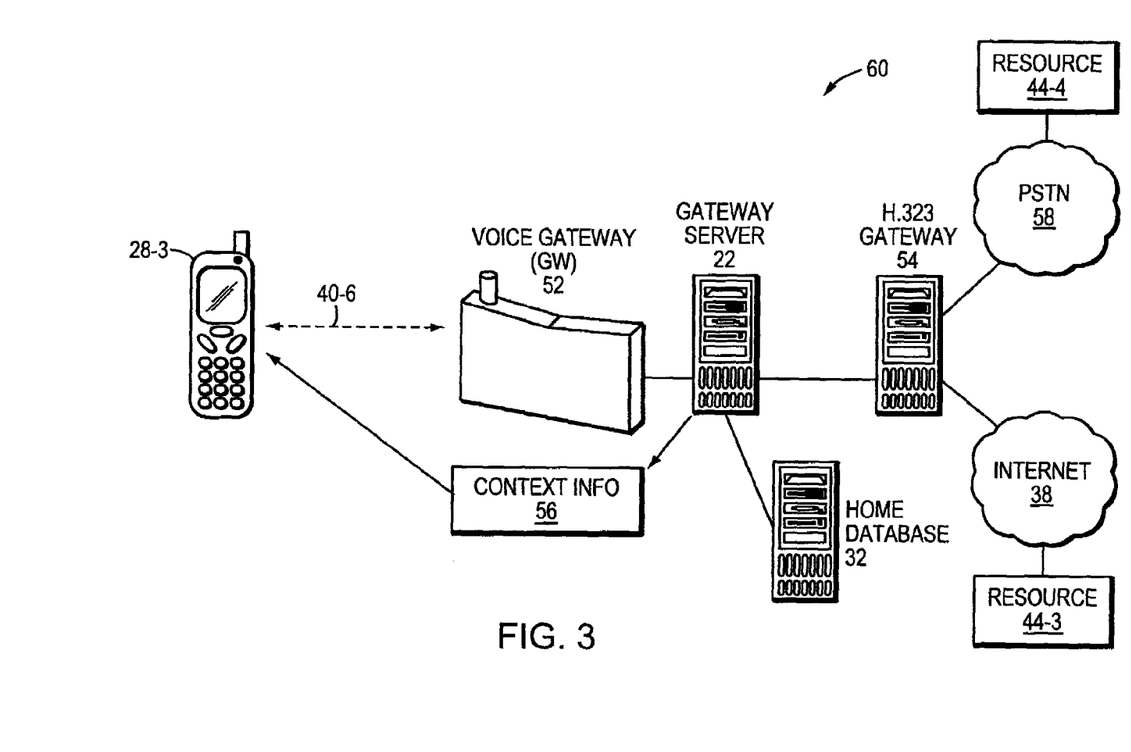
FIG. 3 illustrates a voice enabled networked system that enables sharing of context information provided by a gateway server configured according to the invention.
Figure 4:
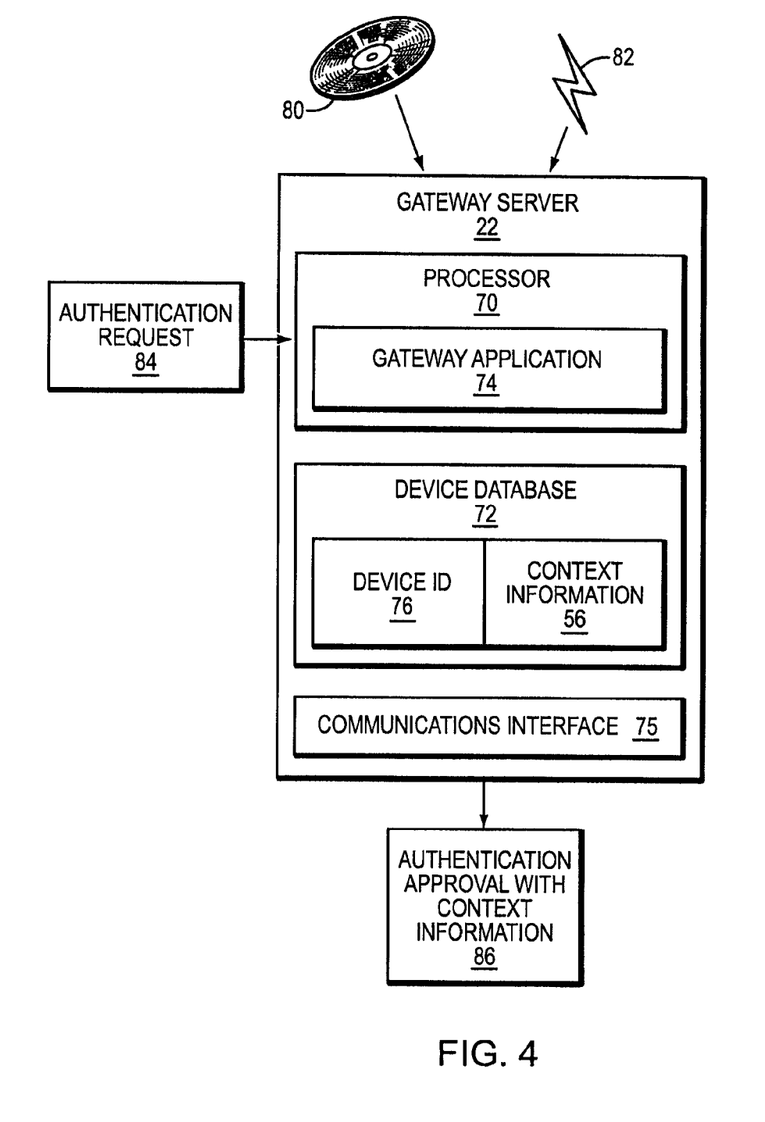
FIG. 4 illustrates an example of a gateway server suitable for use in the networked systems of FIG. 1, 2, and 3.

As described above, FIG. 1 illustrates one networked system 20 suitable for use with the gateway server 22 of the invention. FIG. 2 illustrates another networked system 50 suitable for use with the gateway server 22. FIG. 3 illustrates a voice enabled networked system 60 suitable for use with the gateway server 22. FIG. 4 illustrates the gateway server 22 shown in FIGS. 1, 2, and 3 in more detail.

FIG. 2 illustrates the networked system 50, which enables roaming of a wireless mobile device 28 (e.g., shown in FIG. 2 as PDA mobile device 28-2) between locations supported by the same gateway server 22. In addition to what is illustrated in FIG. 1, FIG. 2 illustrates a conference room base station LAP 24-1, an office base station LAP 24-2, and context information 56 provided from the gateway server 22 to the mobile device 28-2. In a preferred embodiment, the conference room LAP 24-1 is a Bluetooth base station that provides WLAN connections (e.g., connection 40-4) for a conference room (e.g., a conference room in a corporate office or other organizational setting). In a preferred embodiment, the office LAP 24-2 is a Bluetooth base station that provides WLAN connections 40 (e.g., connection 40-5) for one or more offices in a corporate or other organizational setting. The context information 56 is information (e.g., an IP address) associated with a particular mobile device 28-2, such as information indicating the context of an earlier or initial session of the mobile device 28-2 retained (or pointed to) by the gateway server 22, as will be discussed in more detail later.

In reference to FIG. 2, roaming occurs as a user moves a mobile device 28-2 from one location to another, for example, from the conference room into an office. For example, first the device 28-2 is authenticated and connected via a PPP connection 40-4 to conference room LAP 24-1. The user moves out of range and so the packet error rate on the connection 40-4 increases rapidly. The PPP controller in the conference room LAP 24-1 clears down the connection 40-4. The user then moves the device 28-2 into range of the office LAP 24-2 and uses inquiry mode to discover the LAP 24-2. The device 28-2 connects to the LAP 24-2 and re-authenticates. The gateway server 22 recognizes the unique device identifier and re-assigns the IP address and configuration from the previous connection 40-4 to the device 28-2 to be used with the new connection 40-5. It also upgrades the user location.

This approach described immediately above will take at least 10 seconds. For more rapid hand-over it is necessary for the conference room LAP 24-1 to signal to the gateway server 22 that it is terminating the connection 40-4, and then for the gateway server 22 to instruct all the local LAP's 24 to page the device 28-2 by name.

FIG. 3 illustrates a networked system 60 that enables communication of a voice enabled device 28 (e.g., shown in FIG. 3 as mobile telephone 28-3) over a WLAN. In addition to what is shown in FIG. 1, FIG. 3 illustrates a Bluetooth voice gateway 52, an H.323 gateway 54, a PSTN 58 (public switched telephone network), a voice enabled Internet resource 44-3, and a PSTN resource 44-4. The Bluetooth voice gateway 52 is adapted to handle voice communications, such as from the mobile telephone 28-3. The voice gateway 52 is one example of a base station LAP 24. The voice gateway 52 is one example of a Bluetooth base station LAP 24. The H.323 gateway 54 is a server that handles voice-based communications between the gateway server 22 and a PSTN 58 or the Internet 38 (based on the ITU-T H.323 standard for video and/or audio transmission over packet switched networks). The gateway server 22 provides context information 56, such as an IP address, that was previously allocated to the mobile telephone in a previous connection (in a manner similar to the use of context information 56 as described for FIG. 2).

In a general summary of the operation of the networked system 60, the voice enabled mobile device 28 registers with a voice gateway LAP 52 connected to a gateway server 22 when in range. The voice gateway LAP 52 authenticates with gateway server 22 and informs an H.323 gateway 54 (connected to a PSTN 58, the Internet 38, or voice-enabled network) of the new user. The H.323 gateway 54 maps the device 28 to a phone number so that the user may receive calls that are made to the user's home H.323 from the PSTN 58 or the Internet 38. Typically, the voice gateway LAP 52 is a separate device from a data only LAP 24 so that voice and data would not normally be on the same subnet (e.g., Bluetooth scatternet).

If the user roams away from voice gateway LAP 52, then a telephone call for the user is received by a centralized home H.323 server which then forwards the call to the relevant H.323 gateway 54 by looking up the current user location in the gateway server 22 (or a centralized security database or server that maintains information or user locations as indicated by local gateway servers 22 or local security servers).

FIG. 4 illustrates an example of a gateway server 22 suitable for use in the networked systems of FIGS. 1, 2, and 3. The gateway server 22 includes a digital processor 70 (e.g., microprocessor), a device database 72 (e.g., stored in a memory or on a hard disk drive) and a communications interface 75. The digital processor 70 hosts and executes a preferred embodiment of a gateway application 74 that manages context information 56 (e.g., IP address 88 allocated to the mobile device 28) for the mobile device 28 and generally manages the connection between the mobile device 28 and the resource 44 (e.g., routes packets between the mobile device 28 and the resource 44) In general, when the gateway server 22 is referred to herein as performing some function, this means that the digital processor 70 of the gateway server 22 is performing that function based on the instructions of the gateway application 74 that is hosted and executing on the digital processor 70. The device database 72 stores device identifiers 76 for mobile devices 28 and, in a preferred embodiment, context information 56 for each device identifier 76. The communications interface 75 includes communications hardware and software that provides communications over network or other connections (wireless or cable) to other entities such as the base station LAP 24 or a server over the Internet. An authentication request 84 is a Bluetooth (or other WLAN) request originating from a mobile device 28 to authenticate the device 28 and establish a connection 40 between the device 28 and a base station LAP 24. The authentication approval with context information 56 is an approval of the authentication request 84 that includes the context information 56 (e.g., IP address previously assigned to the device identifier 76 in an earlier session of the device 24 previously authenticated by the gateway server 22). The cluster access privileges 46 illustrated in FIG. 1 is one example of context information 56.

In one embodiment, a computer program product 80, including a computer readable or usable medium (e.g., one or more CDROM's, diskettes, tapes, etc.), provides software instructions for the gateway application 74 (see FIG. 4). The computer program product 80 may be installed by any suitable software installation procedure, as is well known in the art. In another embodiment, the software instructions may also be downloaded over a wireless connection. A computer program propagated signal product 82 embodied on a propagated signal on a propagation medium (e.g., a radio wave, an infrared wave, a laser wave, a sound wave, or an electrical wave propagated over the Internet or other network) provides software instructions for the gateway application 74 or any of its components (see FIG. 4). In alternate embodiments, the propagated signal is an analog carrier wave or digital signal carried on the propagated medium. For example, the propagated signal may be a digitized signal propagated over the Internet or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of the computer program product 80 is a propagation medium that the computer may receive and read, such as by receiving the propagation medium and identifying a propagated signal embodied in the propagation medium, as described above for the computer program propagated signal product 82.

Figure 5:
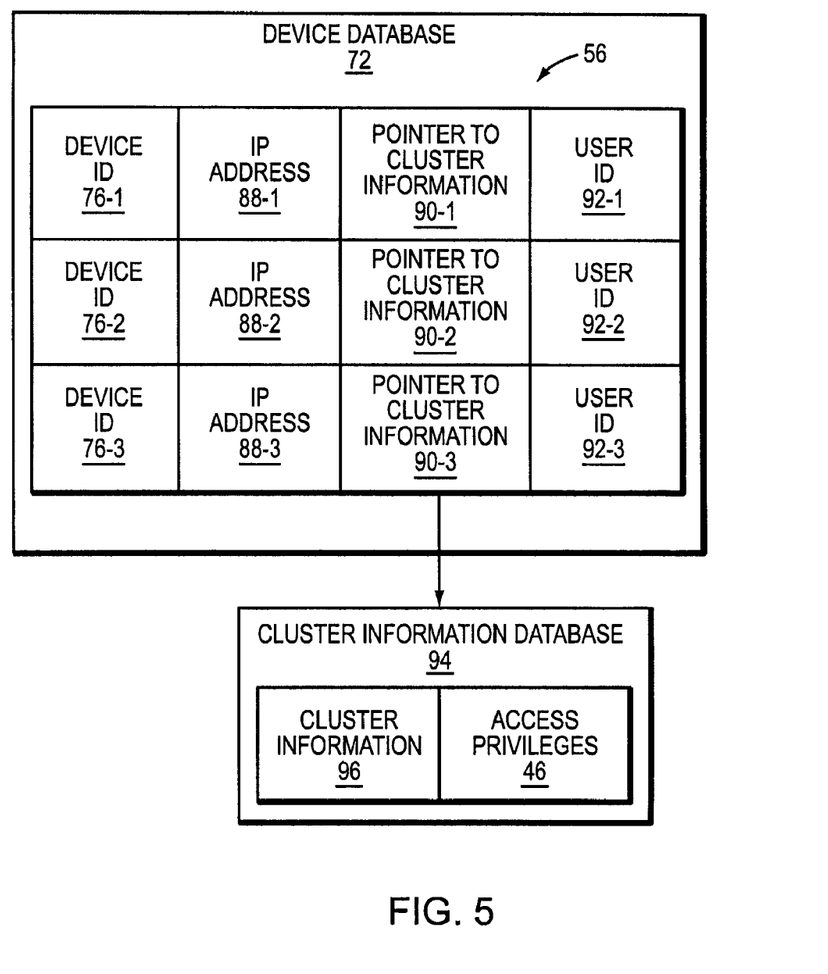
FIG. 5 illustrates an example of a device database suitable for use with the gateway server of FIG. 4.

FIG. 5 illustrates an example of a device database 72 suitable for use with the gateway server 22 of FIG. 4. The device database 72 includes device identifiers 76-1, 76-2, and 76-3. The device identifier 76 is a unique identifier or address for the mobile device 28, such as unique unit identifier for a particular device, a MAC (Media Access Control) address, other network address, or other identification information that uniquely identifies a particular mobile device 28 from any other mobile device 28. The context information 56 includes IP addresses 88 (e.g., 88-1, 88-2, and 88-3) and pointers to cluster information 90 (e.g., 90-1, 90-2, and 90-3). Each IP address 88 (e.g., 88-1, 88-2, and 88-3) and pointer to cluster information 90 (e.g., 90-1, 90-2, and 90-3) are associated with a device identifier 76 (e.g., 76-1, 76-2, and 76-3). The term "pointer to cluster information" uses the term "pointer" in a general sense to indicate a pointer, reference, address, or other indication of where the cluster information 96 is located. Generally, the cluster information 96 may be obtained on a cluster information database 94 associated with the gateway server 22, or in a cluster information database 94 associated with another server, computer, or data server, as will be discussed in more detail later.

The device database 72 also stores user identification information 92 (e.g., 92-1, 92-2, and 92-3) associated with each device ID 76 (e.g., 76-1, 76-2, and 76-3), as shown in FIG. 5. The user identification information 92 includes information identifying or related to a user of a mobile device 28, such as a unique user identifier or a user PIN (Personal Identity Number). The user identification information 92 may also include other user information, such as the user service level (e.g., allocated WLAN bandwidth) if such information is not determined by the cluster access privileges 46. In one embodiment, the user identification information 92 is used by the gateway server 22 but not necessarily stored or retained in the device database 72 after it is used.

Figure 6:
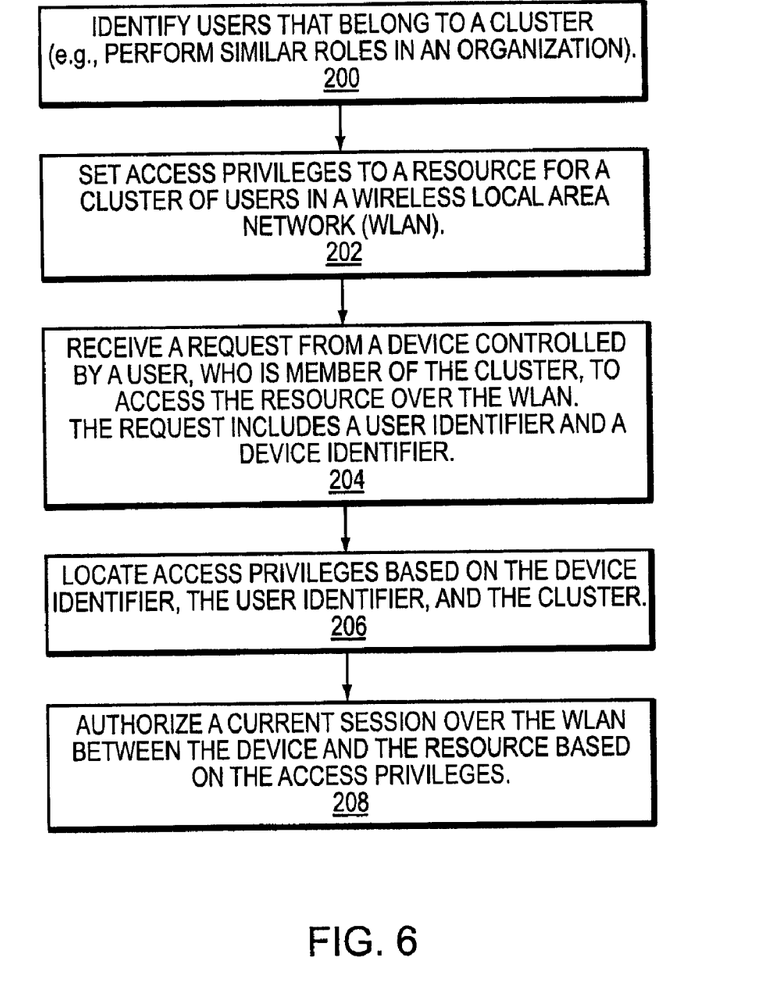
FIG. 6 illustrates a procedure for authorizing access based on cluster access privileges.

FIG. 6 illustrates a procedure for authorizing access based on cluster access privileges 46. In step 200, the security server identifies users that belong to a cluster (e.g., perform similar roles in an organization). Typically, membership in a cluster reflects a role in an organization such as an accountant in a business or a student in a university. For example, students majoring or taking courses in history at a university are members of a history cluster, and students majoring or taking courses in engineering are members of an engineering cluster. In one embodiment, cluster information 96 (that indicates the members of a cluster and the corresponding cluster access privileges 46 for all members of the cluster) are stored on the gateway server 22. In another embodiment, the cluster information 96 and cluster access privileges 46 are stored in a cluster information server separate from the gateway server 22. For example, the information for the history cluster may be stored in a history server (i.e., server computer providing database and other support to the history department). The pointer to the cluster information 90 (as shown in FIG. 5) thus points to a database on the history server having the cluster information 96 and access privileges 46 for the cluster of history students.

In step 202, the gateway server 22 sets access privileges 46 to a resource for a cluster of users in a WLAN. In one embodiment, the gateway server 22 sets the access privileges 46 based on input from an operator. For example, an operator in a history department sets the access privileges 46 for the history cluster of students by entering data at a keyboard at the history server. In such a case, the access privileges 46 may include access to databases of course materials and reference materials in the history server (but not to allow access to course materials and reference materials on databases on servers of other department's computers). The history server is one example of a resource 44. Furthermore, access privileges 46 may specify a bandwidth allocation on the WLAN for each mobile device 28 used by a member of the history cluster that may be different for the bandwidth allocation on the WLAN for mobiles devices of students in other clusters, such as the engineering cluster.

In step 204, the gateway server 22 receives a request from a mobile device 28 controlled by a user who is a member of a cluster to access the resource 44-2. The request includes a user identifier 92 and a device identifier 76. Typically, the request originates from a mobile device 28 to the LAP base station 24, which then passes on the request (as an authentication request) to the gateway server 22.

In step 206, the gateway server 22 locates access privileges 46 based on the device identifier 76, user identifier 92, and the cluster information 96. As described earlier, the cluster information 96 may be stored in a cluster information database 94 associated with the gateway server 22 or another server.

In step 208, the gateway server 22 authorizes a current session over the WLAN between the mobile device 28 and the resource 44 based on the access privileges 46. For example, the gateway server 22 authorizes access to databases on a particular server, such as the history department server, and/or authorizes a certain level of WLAN bandwidth to be allocated to the mobile device 28 that originated the request.

Figure 7:
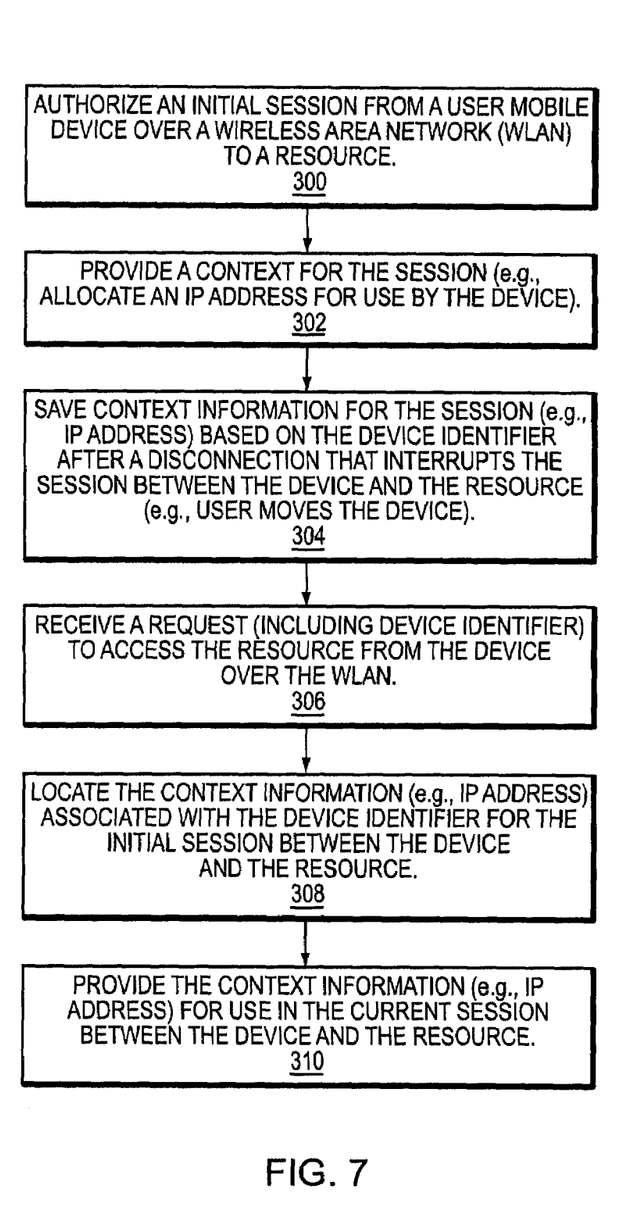
FIG. 7 illustrates a procedure for managing context information in a WLAN.

FIG. 7 illustrates a procedure for managing context information 56 in a WLAN. In step 300, the gateway server 22 authorizes an initial session from a user's mobile device 28 over a WLAN to a resource 44. Typically, the mobile device 28 is then able to communicate with the resource through a networked system, such as the networked system 50 shown in FIG. 2.

In step 302, the gateway server 22 provides a context for the session (e.g., allocates an IP address 88 for use by the device 28). For example, the gateway server 22 dynamically allocates an IP address 88 for use by the mobile device 28 or requests such an allocation from a DHCP (Dynamic Host Configuration Protocol) server. The gateway server 22 may also allocate or specify other information, such as configuration information for the session or the connection 40.

In step 304, the gateway server 22 saves the context information 56 for the session (e.g., IP address 88 and other information) based on the device identifier 76, after a disconnection that interrupts the session between the mobile device 28 and the resource 44. For example, the user moves the mobile device 28 from one location to another, as from a conference room to an office, as shown in FIG. 2. The gateway server 22 stores the IP address 88 in a device database 72 and associates the IP address 88 with the device identifier 76 of the mobile device 28.

In step 306, the gateway server 22 receives a request (including device identifier 76) to access the resource 44 from the mobile device 28 over the WLAN. For example, the user moves the mobile device 28-2 from a conference room to an office out of range of the conference room LAP 24-1 (as shown in FIG. 2), where the mobile device 28-2 comes within range of an office LAP 24-2. Through Bluetooth (or other WLAN protocol) inquiry mode, the mobile device 28-2 seeks to establish a connection with the office LAP 24-2 and obtain renewed access to the resource 44. The office LAP 24-2 communicates with the gateway server 22, providing the request for the mobile device 28-2 to access the resource 44.

In step 308, the gateway server 22 locates the context information 56 (e.g., IP address 88) associated with the device identifier 76 for the initial session between the mobile device 28 and the resource 44. For example, the gateway server 22 looks up the context information 56 in the device database 72 associated with the gateway server 22 and locates the IP address 88-2 associated with a specific mobile device 28-2, as well as other information such as the pointer to the cluster information 90-2 if needed.

In step 310, the gateway server 22 provides the context information 56 (e.g., IP address 88) for use in the current session between the mobile device 28 and the resource 44. For example, the gateway server 22 retrieves the IP address 88-2 associated with the mobile device 28-2 from the device database 72 and reassigns the IP address 88-2 to the mobile device 28-2.

The gateway server 22 may also serve as a centralized security server or clearinghouse (or provide a connection) to such a central server. Such a central security server provides context information 56 (e.g., IP address 88) to different providers of WLAN services. The providers use the context information 56 directly or provides it to local security servers 22 so that users of mobile device may roam to WLAN's provided by different service providers while retaining context information 56 such as an IP address 88 allocated to the mobile device during initial session or connection 40 to a WLAN.

In a preferred embodiment, in which the device identifier 76 is based on a MAC address for the mobile device, the gateway server 22 is a conventional RADIUS server that is extended so that it contains a version of the MAC to IP address cache (e.g., device database 72) that is used by the gateway application 74 to map MAC addresses to IP addresses. In the preferred embodiment, the gateway server 22 recognizes the unique device identifier 76 (in this case the MAC address) and re-assigns the same IP address 88 and configuration. It upgrades the user location, as described in more detail below.

When a mobile device 28 moves to a new subnet, the newly associated LAP 24 starts to answer for the MAC address of the mobile device 28, and also to send out packets to the gateway server 22 with the MAC address of the mobile device. In this case the gateway server 22 is actually a combined router and RADIUS server, as shown in FIG. 4 (perhaps with a centralized database).

In another preferred embodiment, the RADIUS functionality is implemented as a separate RADIUS server that includes the device database 72 (with device identifiers 76 based on the MAC address and corresponding IP addresses 88), and the gateway server 22 hosts and executes the gateway application 74. In this embodiment, the gateway server 22 detects that the packet comes from a mobile device 28 whose MAC address is not part of its subnet cache, and so looks it up in the RADIUS server MAC to IP table (e.g., device database 72). Once found it enters it in its local cache, and updates the RADIUS server with the new location. It also informs the previous gateway server 22 that manages the subnet for the previous connection of the mobile device 28 that the mobile device 28 has moved. The previous gateway server 22 then alerts its routing table so that packets addressed to that IP address 88 are forwarded to the new gateway server 22 for delivery to the mobile device 28.

Figure 8:
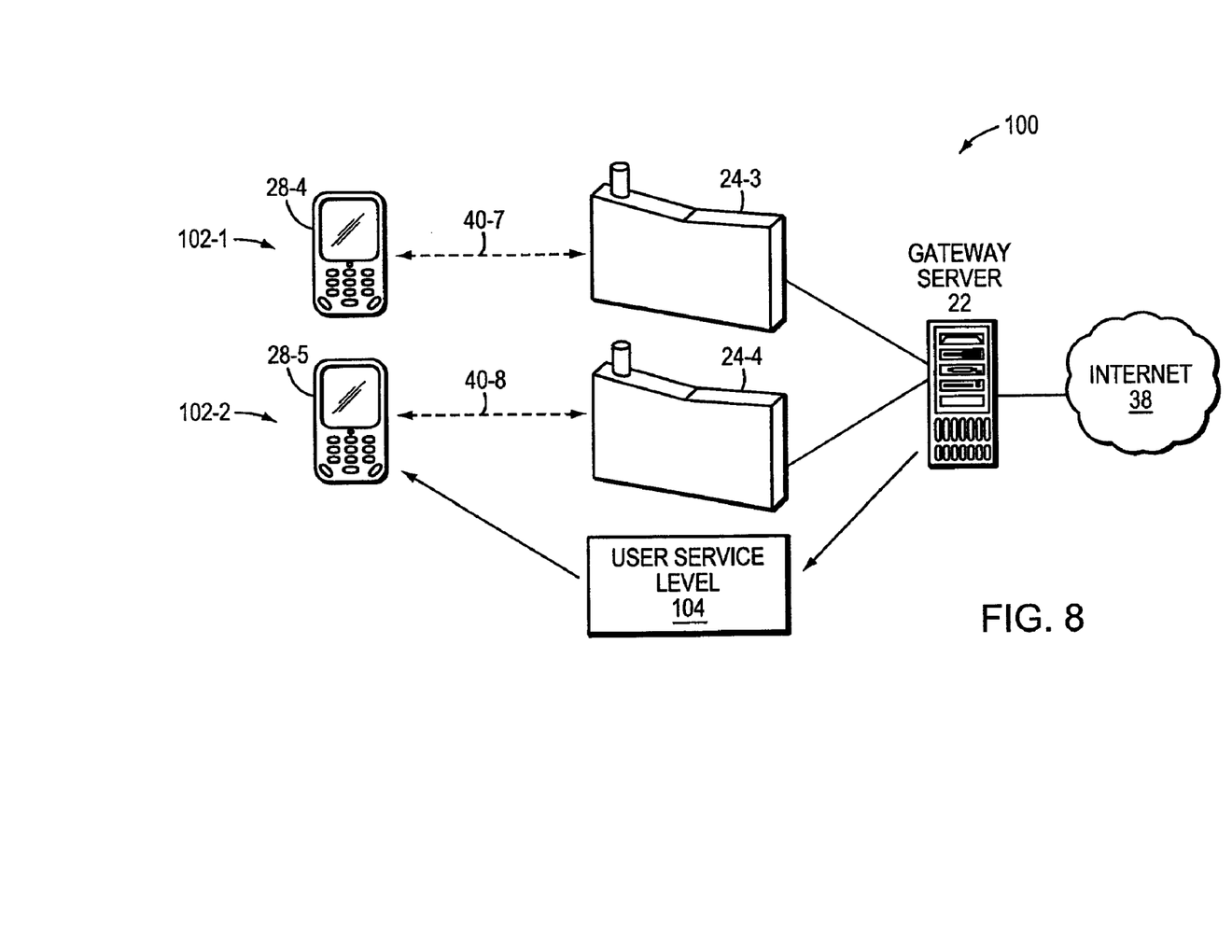
FIG. 8 illustrates a networked system in a WLAN environment with multiple subnets or channels.

FIG. 8 illustrates a networked system 100 in a WLAN environment with multiple channels. FIG. 8 illustrates a gateway server 22 with a connection to the Internet 38, and connections to two base station LAP's 24-3 and 24-4, which have connections 40-7 and 40-8 to user mobile devices 28-4 and 28-5. Mobile device 28-4 is part of scatternet 102-1 and mobile device 28-5 is part of scatternet 102-2. The scatternet 102 is a WLAN channel, such as a Bluetooth scatternet. A scatternet 102 is made up of piconets connected together by a data relay that transfers data packets between piconets so as to transfer the data packets between the mobile device 28 and the LAP 24. Scatternets 102 enable one shared channel of a Bluetooth network to cover a larger physical area. In the IEEE 802.11 protocol the same concept applies, but the term channel is applied in place of piconet, and scatternets 102 can be built by linking IEEE 802.11 channels together using a relay device. The invention is described in terms of scatternets 102 but also works in a piconet because a piconet is the most simple implementation of a scatternet 102. Each scatternet 102-1 and 102-2 may have a larger number of users than is shown is FIG. 8, which shows only one representative mobile device 28-4 or 28-5 per scatternet 102-1 or 102-2.

In a crowded environment such as a conference room there may well be multiple devices 28 desiring high speed WLAN access. Maximum asymmetric capacity per scatternet 102 (e.g., Bluetooth scatternet) is 721 kbps up (or down) and 56 kbps up (or down) but this is split between the seven active users (for a scatternet 102 that is limited to this number of users). In Bluetooth, a scatternet 102 is two or more channels (Bluetooth piconets) co-located in the same area. Symmetric mode gives 460 kbps in each direction. Operating 10 scatternets 102 in the same location only reduces throughput per scatternet 102 to around 650 kbps, so for best performance users should be spread between scatternets 102. Users should also be assigned to symmetric or asymmetric scatternets 102 according to their traffic pattern. They can also obtain faster speeds (1.4 Mbps) by being assigned multiple parallel channels using multi-channel (as used for ISDN).

Users can choose which scatternet 102 to join by signaling busy scatternets 102 via the loading variable in the SDP (service discovery protocol). Users can be directed to join a particular scatternet 102 by signaling "busy" scatternet 102 via the loading variable in the radio protocol header. Not all users may pay attention, and it may be desirable to introduce different levels of service for different users.

In operation, the mobile device 28 requests service from a LAP 24 by sending a request along with its device address (e.g., device identifier 76). The LAP 24 (which is a scatternet master) would normally simply respond by paging the device 28 and starting the synchronization. Instead, in the present invention, the LAP 24 passes the request along with the device address (i.e., device identifier 76) back to the gateway server 22 which looks up the user's service level 104 and the loading on each of the relevant scatternets 102 in accordance with the procedure illustrated in FIG. 6. The user's service level 104 is an example of a cluster access privilege 46 or context information 56. The gateway server 22 then signals to the appropriate LAP 24 to page the device 28 (this may not be the LAP 24 that received the request).

When a mobile device 28 has mobile radio interfaces (that is, both a Bluetooth interface and a 802.11b interface) or can participate in one of a number of overlapping channels (which is the general case of a scatternet 102), then when the mobile device 28 moves to a new channel and starts to send packets, the gateway server 22 looks up the device 28 in the device database 72, and according to the user service level and scatternet loading (e.g., traffic or congestion on the subnet that the mobile device is connected to) might decide that the mobile device 28 should be communicating via another channel that is covering that mobile device 28. The mobile device 28 may be directed to a different channel (e.g., Bluetooth piconet) within a scatternet 102, or to a different scatternet 102. In that case the mobile device 28 is forced to transfer its connection 40. For example, mobile device 28-4 is seeking to make a new connection to one of the scatternets 102-1 or 102-2 in FIG. 8. First the mobile device 28-4 seeks to make a connection to congested scatternet 102-2. The gateway server 22 thus directs the mobile device 28-4 to join a less congested scatternet 102-1, with the result shown by connection 40-7 in FIG. 8. Subsequently, mobile device 28-4 access to resources 44 is provided without requiring re-registration with the gateway server 22, following the procedure of FIG. 7.

Figure 9:
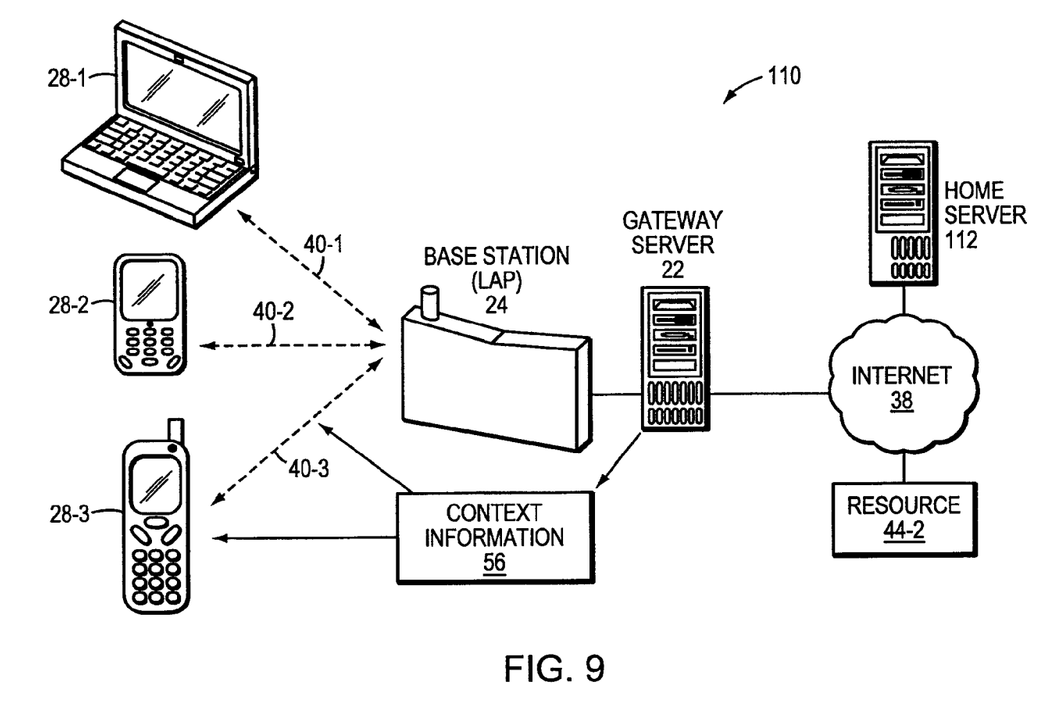
FIG. 9 illustrates a networked system in a WLAN environment with a gateway server and a home server.

FIG. 9 illustrates a networked system 110 in a WLAN environment with a gateway server 22 and a home server 112. The home server 112 is a network (e.g., Internet) server computer that provides authentication services, such as RADIUS authentication services, for a user with a mobile device 28 seeking access to a resource 44-2 available on the networked system 110. The home server 112 functions as a home or base server for the user of the mobile device 28, and may provide cluster information or context information 56 (as described previously).

In an example of using a home server 112, the user of a mobile device 28 first initiates a log on to a remote network, and indicates a desire to use restricted or "for charge" resources 44-2. The mobile device 28 starts an authentication session with the local gateway server 22. The mobile device 28 supplies the name of the home server 112 as part of the user identification during the authentication process (e.g., user@radius5.employer.com). The local gateway server 22 authenticates the user with the user's home server 112, passing back to the home server 112 the location (base station LAP 24 and network), IP address, and billing information.

This completes the registration of the mobile device 28 with the home server 112, which stores the mobile device 28 IP address and location of the mobile device 28. The user (i.e., device owner) may also set up a list of preferences indicating who is allowed to know the location of the mobile device 28 and which messages are allowed to be forwarded to the mobile device 28.

In one embodiment, the home server 112 (or other central authentication server) can act as a central roaming clearing house for companies and Bluetooth (or other wireless protocol) ISP's that provide WLAN services. The WLAN operator then needs only have one authentication and billing agreement with the central server (e.g., home server 112). Users are billed by their home network provider (e.g., ISP or corporation). Users that do not have a "home" who wish to use a free service (e.g., Internet access) can register with the central or home server 112 so that they can be authenticated but not charged.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for authorizing access by a user to a resource over a wireless local area network, comprising the steps of:
   setting access privileges to the resource for a cluster of users of the wireless local area network, wherein the cluster is indicative of the user's role in an organization and the access privileges represent data access rights of members of the cluster to the resource;
   receiving a request from a device controlled by the user to access the resource over the wireless local area network, the user having a membership in the cluster, and the request including a user identifier for the user and a device identifier for the device making the request;
   locating session context information based on the device identifier, the session context information having been associated with the device identifier during a previous wireless session;
   locating access privileges in response to the user identifier and the device identifier in the received request based on the device identifier, the user identifier, and the cluster; and
   using the located access privileges and data contained in the session context information to authorize a current session between the device and the resource.

2. A system comprising a digital processor for authorizing access by a user to a resource over a wireless local area network, the system comprising:
   a gateway application executing on the digital processor for setting access privileges to the resource for a cluster of users of the wireless local area networks wherein the cluster is indicative of the user's role in an organization and the access privileges represent data access rights of members of the cluster to the resource; and
   a communications interface coupled with the digital processor for receiving a request from a device controlled by the user to access the resource over the wireless local area network, the user having a membership in the cluster, and the request including a user identifier for the user and a device identifier for the device making the request,
   the gateway application being responsive to the user identifier and the device identifier in the received request and:
     (i) locating session context information based on the device identifier, the session context information having been associated with the device identifier during a previous wireless session;
     (ii) locating access privileges based on the device identifier, the user identifier, and the cluster; and
     (iii) using the located access privileges and data contained in the session context information to authorize a current session between the device and the resource.

3. A computer program product that includes a computer usable medium having computer program instructions stored thereon for authorizing access by a user to a resource over a wireless local area network, such that the computer program instructions, when performed by a digital processor, cause the digital processor to:
   set access privileges to the resource for a cluster of users of the wireless local area network, wherein the cluster is indicative of the user's role in an organization and the access privileges represent data access rights of members of the cluster to the resource;
   receive a request from a device controlled by the user to access the resource over the wireless local area network, the user having a membership in the cluster, and the request including a user identifier for the user and a device identifier for the device making the request;
   locate, in response to the device identifier, session context information associated with the device identifier during a previous wireless session;
   locate, in response to the user identifier and the device identifier in the received request, access privileges based on the device identifier, the user identifier, and the cluster; and
   use the located access privileges and data contained in the session context information to authorize a current session between the device and the resource.

4. A method for managing context information for a wireless local area network, comprising the steps of:
   receiving a request to access the resource over the wireless local area network, the request including a device identifier for a device making the request;
   locating, in response to the received request, session context information associated with the device identifier, the session context information having been assigned to the device during a previous wireless session between the device and the resource and including access privileges associated with a cluster of users, wherein the cluster is indicative of the users'role in an organization and the access privileges represent data access rights of members of the cluster to the resource; and
   providing the session context information to the device, thereby facilitating authentication of a current session between the device and the resource, based at least in part on the session context information and the access privileges.

5. The method of claim 4, wherein the wireless local area network is based on a radio frequency suitable for use in local wireless communications.

6. The method of claim 4, wherein communications over the wireless local area network are based on a spread-spectrum technique based on a carrier frequency greater than about 2,000 megahertz.

7. The method of claim 4, wherein the device identifier is a unique identification number.

8. The method of claim 4, wherein the session context information includes an internet protocol address assigned to the device in the previous wireless session.

9. The method of claim 4, wherein the access privileges associated with a cluster of users was set for the cluster in a previous request to access the resource.

10. The method of claim 4, wherein the device is a voice-enabled communications device, and the gateway server is adapted for voice-enabled network communications.

11. A system comprising a digital processor for managing context information for a wireless local area network, the system comprising:
- a communications interface coupled with the digital processor for receiving a request to access the resource over the wireless local area network, the request including a device identifier for a device making the request; and
- a gateway application executing on the digital processor, in response to the received request, the gateway application locating session context information associated with the device identifier, the session context information associated with a previous wireless session between the device and the resource and including access privileges associated with a cluster of users, wherein the cluster is indicative of the users' role in an organization and the access privileges represent data access rights of members of the cluster to the resource, and providing the session context information and access privileges to authorize a current session between the device and the resource based thereon.

12. The system of claim 11, wherein the wireless local area network is based on a radio frequency suitable for use in local wireless communications.

13. The system of claim 11, wherein communications over the wireless local area network are based on a spread-spectrum technique based on a carrier frequency greater than about 2,000 megahertz.

14. The system of claim 11, wherein the device identifier is a unique identification number.

15. The system of claim 11, wherein the session context information includes an internet protocol address assigned to the device in the previous wireless session.

16. The system of claim 11, wherein the access privileges associated with a cluster of users was set for the cluster in a previous request to access the resource.

17. The system of claim 11, wherein the device is a voice-enabled communications device, and the gateway server is adapted for voice-enabled network communications.

18. A computer program product that includes a computer usable medium having computer program instructions stored thereon for managing context information for a wireless local area network, such that the computer program instructions, when performed by a digital processor, cause the digital processor to:
- receive a request to access the resource over the wireless local area network, the request including a device identifier for a device making the request;
- locate, in response to the received request, session context information associated with the device identifier, the session context information associated with a previous wireless session between the device and the resource and including access privileges associated with a cluster of users, wherein the cluster is indicative of the users' role in an organization and the access privileges represent data access rights of members of the cluster to the resource; and
- initiating a current session between the device and the resource based at least in part on the session context information and the access privileges.

* * * * *